United States Patent [19]

Tonutti

[11] Patent Number: 5,752,375
[45] Date of Patent: May 19, 1998

[54] ARTICULATED BIFOLD HAY RAKE

[75] Inventor: Carletto Tonutti, Tricesimo, Italy

[73] Assignee: Tonutti S.p.A., Italy

[21] Appl. No.: 571,291

[22] Filed: Dec. 12, 1995

[51] Int. Cl.$^6$ ................................................ A01D 78/14
[52] U.S. Cl. ............................ 56/365; 56/370; 56/385; 56/396
[58] Field of Search .......................... 56/365, 367, 370, 56/378, 379, 380, 384, 385, 396, 397

[56] References Cited

U.S. PATENT DOCUMENTS

| | | |
|---|---|---|
| 2,727,347 | 12/1955 | Fenster et al. |
| 2,895,278 | 7/1959 | Huddle et al. |
| 3,948,028 | 4/1976 | Reber. |
| 4,179,872 | 12/1979 | Gerlinger. |
| 4,183,198 | 1/1980 | Sligter. |
| 4,245,458 | 1/1981 | Smith. |
| 4,370,846 | 2/1983 | Arnold. |
| 4,723,402 | 2/1988 | Webster et al. |
| 4,785,614 | 11/1988 | Schoenherr. |
| 4,932,197 | 6/1990 | Allen. |
| 4,947,631 | 8/1990 | Kuehn. |
| 4,974,407 | 12/1990 | Rowe et al. |
| 4,977,734 | 12/1990 | Rowe et al. ........................ 56/15.9 |
| 5,062,260 | 11/1991 | Tonutti .............................. 56/380 |
| 5,127,216 | 7/1992 | Kelderman ...................... 56/15.9 |
| 5,155,986 | 10/1992 | Kelderman ...................... 56/365 |
| 5,177,945 | 1/1993 | Tonutti ............................. 56/365 |
| 5,231,829 | 8/1993 | Tonutti ............................. 56/377 |
| 5,263,306 | 11/1993 | Tonutti ............................. 56/377 |
| 5,305,590 | 4/1994 | Peeters ......................... 56/384 X |
| 5,313,772 | 5/1994 | Tonutti ............................. 56/377 |
| 5,404,702 | 4/1995 | Lewis .............................. 56/365 |
| 5,540,040 | 7/1996 | Peeters ......................... 56/385 X |

OTHER PUBLICATIONS

H&S Manufacturing Co. Inc./H&S Bi-Fold Wheel Rake Brochure, Oct. 1989.

*Primary Examiner*—Terry Lee Melius
*Attorney, Agent, or Firm*—Andrus, Sceales, Starke & Sawall

[57] ABSTRACT

A pull-type bifold hay rake includes a draw bar assembly connected to a tow vehicle, a support linkage mounted to the draw bar assembly, a trolley assembly having a cross-member assembly, and a pair of articulated rake arm assemblies, each being pivotably connected to an end of the cross-member assembly. Each of the rake arm assemblies are also connected to the support linkage at a point spaced from the pivotable mounting of each rake arm assembly to the cross-member assembly. A series of rotatable rake wheels are mounted to each rake arm assembly as well as the trolley assembly for movement between a raised and a lowered position. The rake arm assemblies are movable between an operative, open position and an inoperative, closed position. A hydraulic cylinder mounted on the trolley assembly moves the rake arm assemblies between their open and closed positions. A control arrangement is mounted on each rake arm assembly to provide movement of the rake wheels between their raised and lowered positions in response to operation of the hydraulic cylinder.

29 Claims, 7 Drawing Sheets

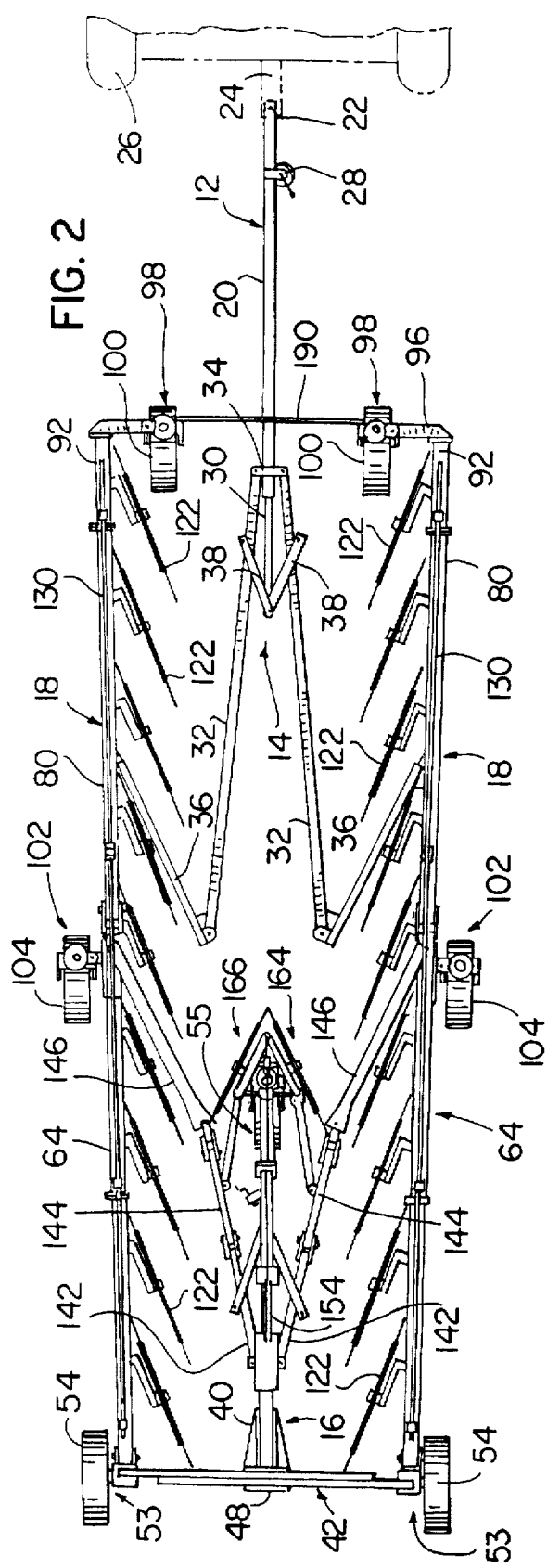
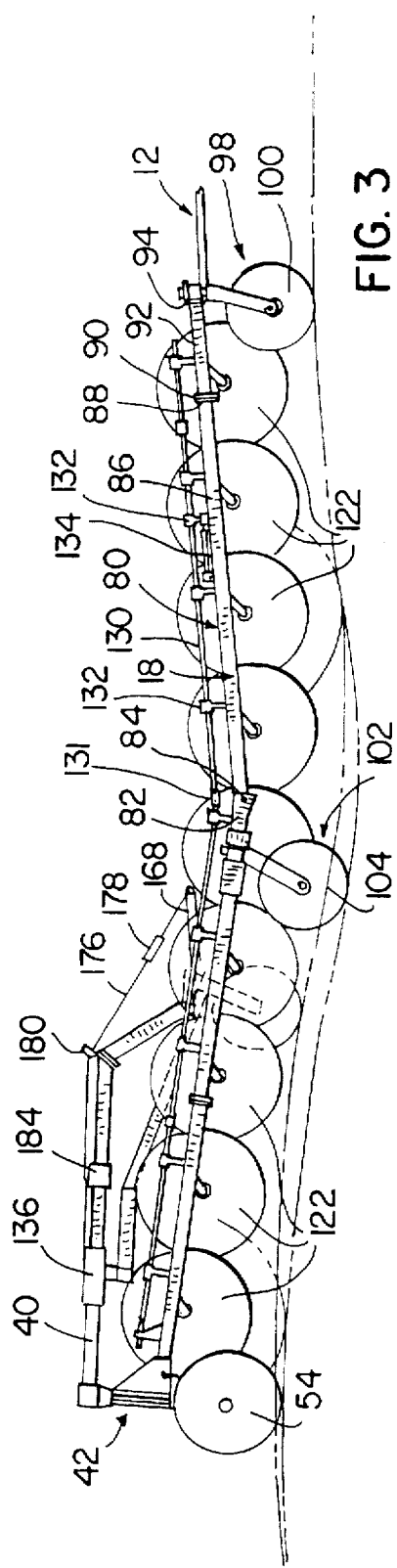
FIG. 2
FIG. 3

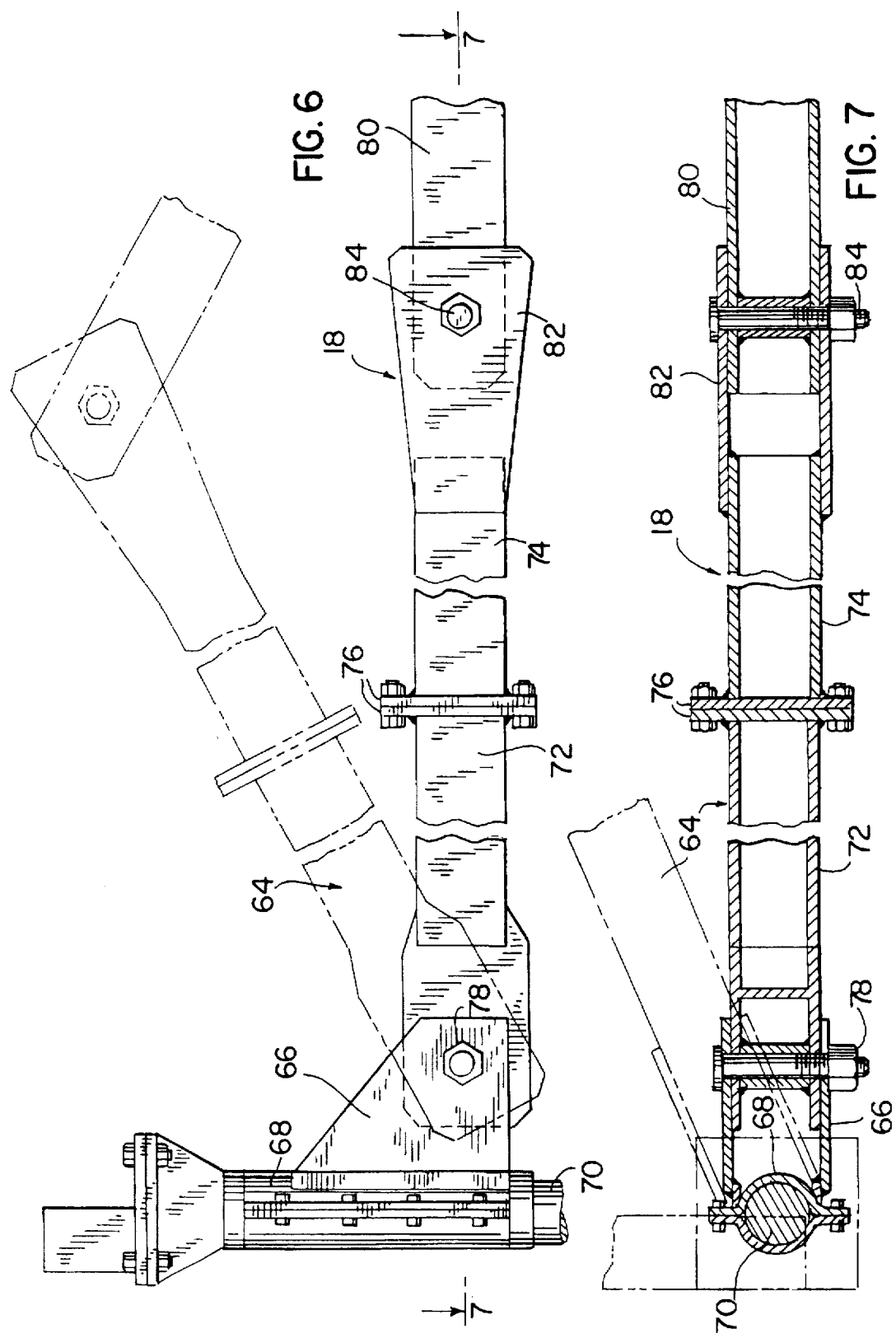

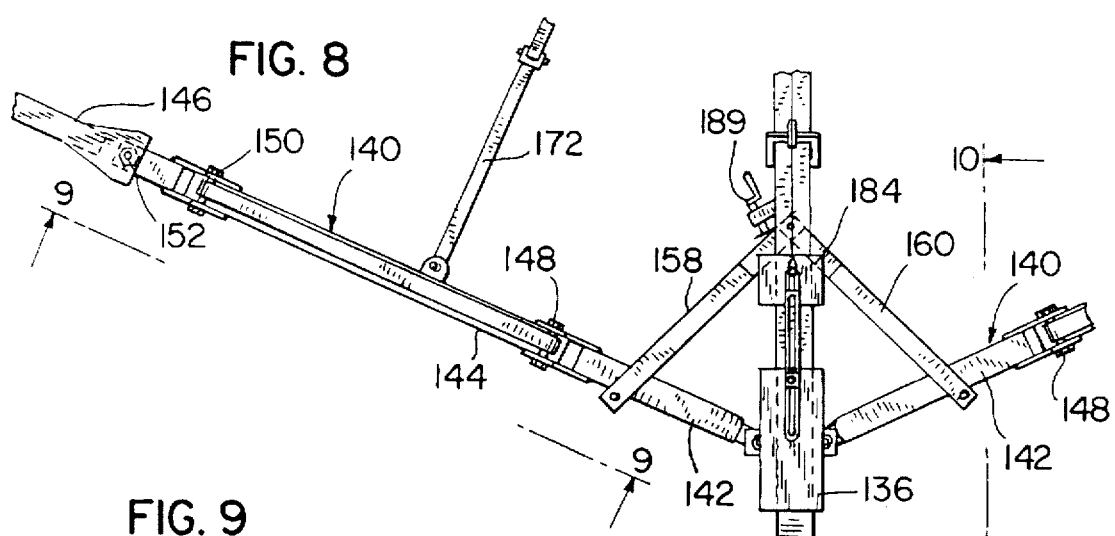
FIG. 8
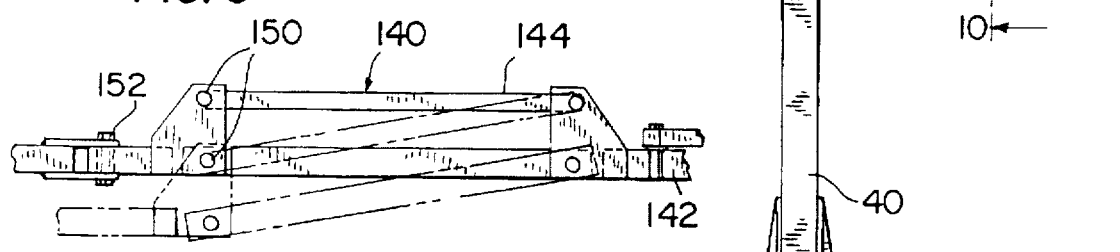
FIG. 9
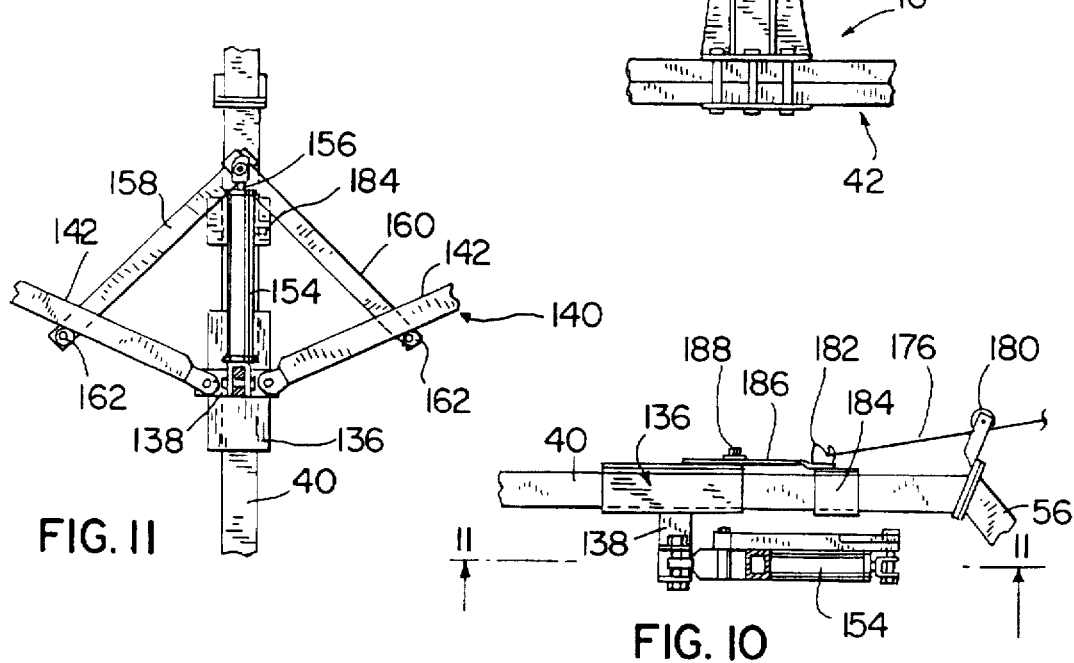
FIG. 11
FIG. 10

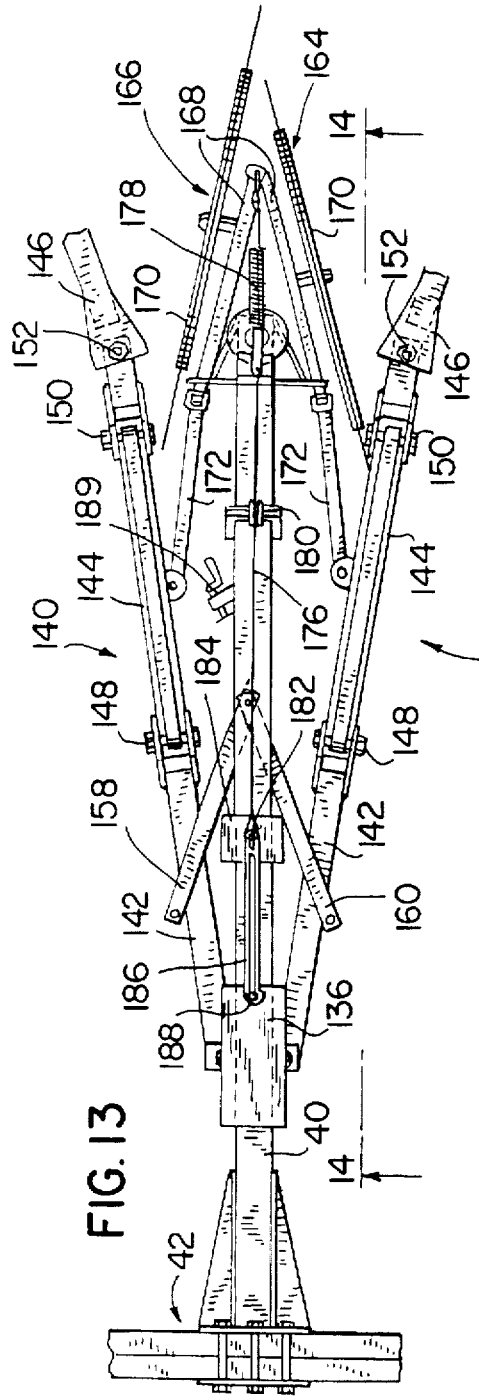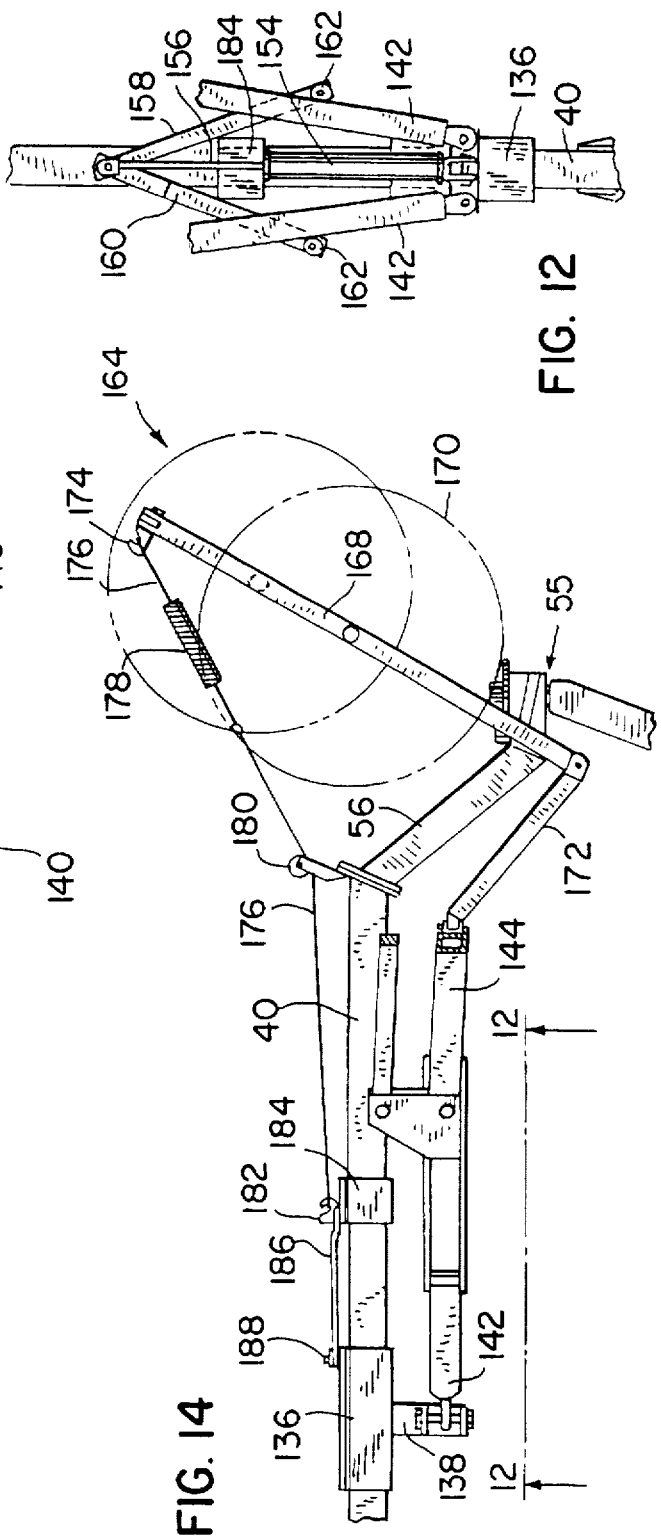

ARTICULATED BIFOLD HAY RAKE

BACKGROUND AND SUMMARY OF THE INVENTION

This invention relates to a pull-type hay rake, and more particularly to a bifold hay rake having a pair of articulated rake arms which are interconnected with a frame for movement between an inoperative, closed position and an operative, open position.

Bifold hay rakes are well known in the art, and generally include a cross-member to which a pair of rake arms are pivotably mounted. A series of rakes are mounted to each rake arm, and are movable between an operative, lowered position and an inoperative, raised position. The rake arms are movable between a closed position in which the rake arms are moved toward each other, and an open position in which the rake arms are moved apart from each other to form a generally V-shape when viewed in plan. An opening and closing mechanism is connected to the rake arms for selectively moving the rake arms between their open and closed positions.

An example of a bifold hay rake of this type is illustrated in Tonutti U.S. Pat. No. 5,062,260, the disclosure of which is hereby incorporated by reference. This patent discloses a pair of rear wheels mounted one to each end of the cross-member, and a pair of front wheels mounted one to each rake arm forwardly of the rear wheels. A closed polygonal frame assembly is movable between first and second positions to move the rake arms between their closed and open positions, respectively, in response to operation of hydraulic cylinder or the like.

It is an object of the present invention to provide a bifold hay rake having a trolley assembly on which the rake arm assemblies are supported, on which the opening and closing mechanism for the rake arm assemblies is mounted, and on each side of which an additional rotatable rake is disposed. It is a further object of the present invention to provide a bifold hay rake with utilizes a pair of articulated rake arm assemblies, as opposed to the rigid rake arms as disclosed in U.S. Pat. No. 5,062,260. These articulated rake arm assemblies enable the rotatable rakes to maintain a constant distance from the ground in their lowered position regardless of terrain.

In accordance with the invention, a pull-type bifold hay rake includes a draw bar assembly connected to a tow vehicle and a support linkage connected to the draw bar assembly. A trolley assembly spaced from and independent of the support linkage includes a central arm having a forward end and a rearward end, and a cross-member assembly having a pair of spaced ends, the rearward end of the central arm being mounted substantially perpendicular to the cross-member assembly. The forward end of the central arm is provided with a first ground engaging wheel and each of the ends of the cross-member are provided with second and third ground engaging wheels, respectively. A pair of rake arm assemblies are pivotably mounted one to each of the ends of the cross-member assembly. Each of the rake arm assemblies has a plurality of rotatable rake wheels mounted thereto for movement between an inoperative, raised position and an operative, lowered position. Each of the rake arm assemblies is pivotable between an operative, open position in which the rake arm assemblies are moved away from each other and an inoperative, closed position in which the rake arm assemblies are moved toward each other. Each of the rake arm assemblies is also connected to the support linkage at a point spaced from the pivotable mounting of each rake arm assembly to the cross-member assembly. A mechanism is provided for moving the rake arm assemblies between the open position and the closed position. The bifold hay rake includes a bracket slidably mounted along the central arm and a pair of support arm assemblies, each having an inner end pivotably attached to the bracket and an outer end pivotably attached to one of the rake arm assemblies. A pair of coupling members is provided for supporting a pair of splitter wheel assemblies on each side of the central arm. Each coupling member has a rearward end pivotably attached to one of the support arm assemblies and a forward end pivotably mounted to one of the splitter wheel assemblies. Each of the splitter wheel assemblies is also mounted for movement between an inoperative, raised position and an operative, lowered position. The bifold hay rake further includes fourth and fifth ground engaging wheels, each being mounted generally midway along and outboard of one of the rake arm assemblies, and sixth and seventh ground engaging wheels, each being mounted inboard of one of the rake arm assemblies at a point opposite the pivotal mounting of one of the rake arm assemblies to one of the ends of the cross-member assembly. The support linkage comprises a series of link members pivotably interconnected with each other and with the draw bar assembly wherein a pair of link members are pivotably connected between the draw bar assembly and one of the rake arm assemblies. The rake also includes a mechanism for raising and lowering the rake wheels, and for raising and lowering the splitter wheel assemblies. A mechanism is mounted on the central arm for regulating the pressure applied to the first ground engaging wheel by the trolley assembly.

According to another aspect of the invention, a pull-type bifold rake suitable for use on even and uneven terrains comprises a draw bar assembly connected to a tow vehicle and a cross-member assembly spaced from the draw bar assembly and terminating in a pair of spaced ends, one disposed on either side of the draw bar assembly. A pair of rake arm assemblies is pivotably mounted one to each end of the cross-member assembly, each rake arm assembly having a plurality of rotatable rake wheels mounted thereto. Each of the rake arm assemblies is pivotable between an operative, open position in which the rake arm assemblies are moved away from each other and an inoperative, closed position in which the rake arm assemblies are moved toward each other. The rake wheels are movably mounted to the rake arm assemblies for movement between an inoperative, raised position and an operative, lowered position. A series of ground engaging wheels is mounted to the rake arm assemblies on either side of the draw bar assembly. A rake arm assembly actuator mechanism is provided for selectively moving the rake arm assemblies between the open and closed positions. A rake wheel actuator mechanism is also provided for selectively moving the rake wheels between the raised and lowered positions. Each of the rake arm assemblies include a first side frame and a second side frame pivotably mounted to the first side frame. The first and second side frames are constructed and arranged to provide an articulated movement such that the rake wheels maintain a constant distance from the ground regardless of uneven terrain. The first side frame has a rearward end and a forward end, and the second side frame has a rearward end and a forward end. The rearward end of the first side frame is pivotably mounted about a vertical axis and pivotably mounted about a first horizontal axis to one of the ends of the cross-member assembly. The forward end of the first side frame is pivotably mounted about a second horizontal axis to the rearward end of the second side frame. Each of the rake arm assemblies includes an extension mounted to each of the forward ends of the second side frames. Certain of the ground engagement wheels are positioned outboard of each rake arm assembly preventing outward movement of each of the rake arm assemblies beyond the open position. The bifold hay rake includes a mechanism for removably connecting the other of the ground engaging wheels to each other when the rake arm assemblies are in the closed position.

Various features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 2 is a top view of the rake shown in FIG. 1 but in an inoperative, closed or transport position;

FIG. 3 is side elevational view of the rake shown in FIG. 2, with reference to line 3—3 of FIG. 1, illustrating the manner in which the rake adapts to an even or uneven terrain;

FIG. 4 is an enlarged detail view of a clutched ground wheel of the rake as viewed from a side elevation;

FIG. 5 is a front view of the ground wheel shown in FIG. 4;

FIG. 6 is a side view of the articulated side frames of the rake;

FIG. 7 is a section view taken along line 7—7 of FIG. 6;

FIG. 8 is a top view of the opening and closing mechanism used in the rake and shown in the open position;

FIG. 9 is a side elevation view of the opening and closing mechanism of FIG. 8, with reference to line 9—9 of FIG. 8;

FIG. 10 is a cross-sectional view taken on line 10—10 of FIG. 8;

FIG. 11 is a cross-sectional view taken on line 11—11 of FIG. 10 showing the bottom of the opening and closing mechanism;

FIG. 12 is similar to FIG. 11 showing the opening and closing mechanism in the closed position and taken on line 12—12 of FIG. 14;

FIG. 13 is a view similar to FIG. 8 showing the closed position of the opening and closing mechanism;

FIG. 14 is a side view taken on line 14—14 of FIG. 13 showing the raising and lowering system for the pair of splitter wheels;

DETAILED DESCRIPTION OF THE PREFERRED EMBODIMENT

Figure 1:
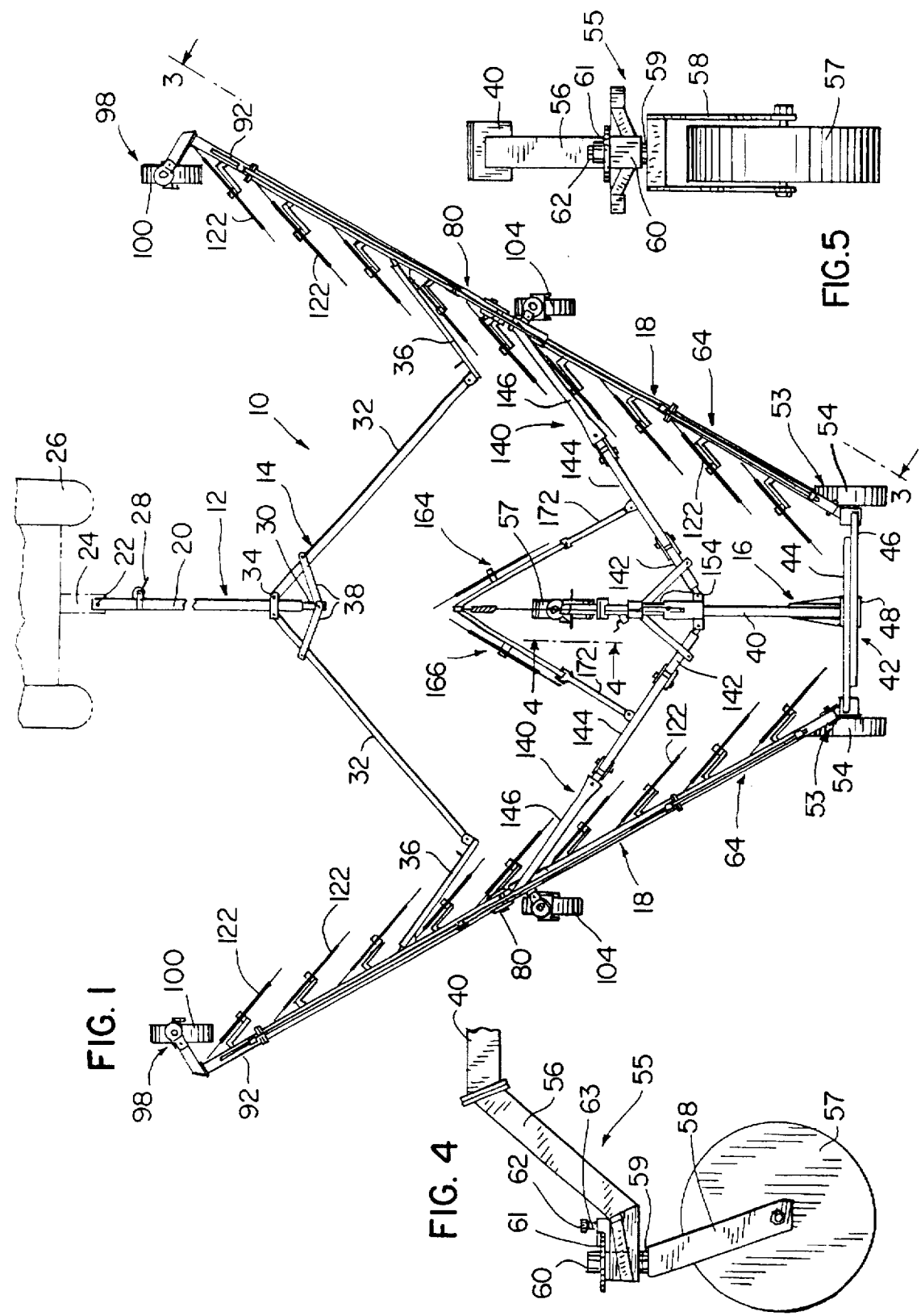
FIG. 1 is a top view of a pull-type, articulated bifold all terrain rake shown in an operative, open or working position.

Referring now to FIGS. 1 and 2, a bifold hay rake 10 constructed according to the invention comprises a draw bar assembly 12, a support linkage 14, a trolley assembly 16, and a pair of rake arm assemblies 18.

Draw bar assembly 12 includes an outer tubular member 20 connected by a mounting pin 22 to the hitch 24 of a towing vehicle 26 such as a tractor. Outer tubular member 20 is provided with a lever 28 for adjusting the vertical position of the draw bar assembly 12 relative to the tractor for adjusting the vertical orientation of rake 10 relative to the ground. Draw bar assembly 12 further includes an inner tubular member 30 which is slidably mounted within outer tubular member 20 and cooperates with support linkage 14 interposed between draw bar assembly 12 and rake arm assemblies 18.

Support linkage 14 includes a pair of inner link members 32 pivotably mounted at their forward ends to a bracket 34 fixed on outer tubular member 20, and a pair of outer link members 36 pivotably mounted at their rearward ends to the rearward end of inner link members 32 and at their forward ends to rake arm assemblies 18. Support linkage 14 also includes a pair of support link members 38 pivotably mounted at their rearward ends to the inner tubular member 30 and pivotably mounted at their forward ends to the inner link members 32. As will be more fully appreciated hereafter, the support linkage 14 made up of inner, outer and support link members 32, 36, 38, respectively, is movable between a first position as shown in FIG. 1 in which the link members 32, 36, 38 are moved apart from each other to move rake arm assemblies 18 to an open position, and a second position shown in FIG. 2 in which link members 32, 36, 38 are moved together to draw rake arm assemblies 18 together toward draw bar assembly 12.

According to the invention, the trolley assembly 16 is independent of the draw bar assembly 12 and support linkage 14, and is spaced rearwardly therefrom. Trolley assembly 16 includes a central arm 40 having a longitudinal axis which defines the center line of the rake 10 and is colinear with the longitudinal axis of the draw bar assembly 12. Central arm 40 is rigidly mounted substantially perpendicular to a cross-member assembly 42 having a pair of beams 44, 46 slidably mounted with respect to each other in a bracket 48 fixedly mounted on the rearward end of central arm 40. Cross-member assembly 42 is constructed so as to allow it to be either lengthened or shortened, as desired in order to increase or decrease the width (typically 36 to 60 inches) of the windrow of crop material formed upon operation of rake 10. Cross-member assembly 42 can either be a sliding type assembly providing adjustability in its length, or rake arm assemblies 18 may be mounted to cross-member assembly 42 in a manner providing adjustment in the location at which rake arm assemblies 18 are mounted to cross-member assembly 42. In the preferred embodiment shown in FIG. 15, rotation of a crank arm 50 will provide rotation of an adjustment screw 51, which causes the sliding of beams 44, 46 relative to each other. When the desired width setting is attained, the beams 44, 46 are locked in place relative to each other by means of bolted brackets 52.

Figure 15:
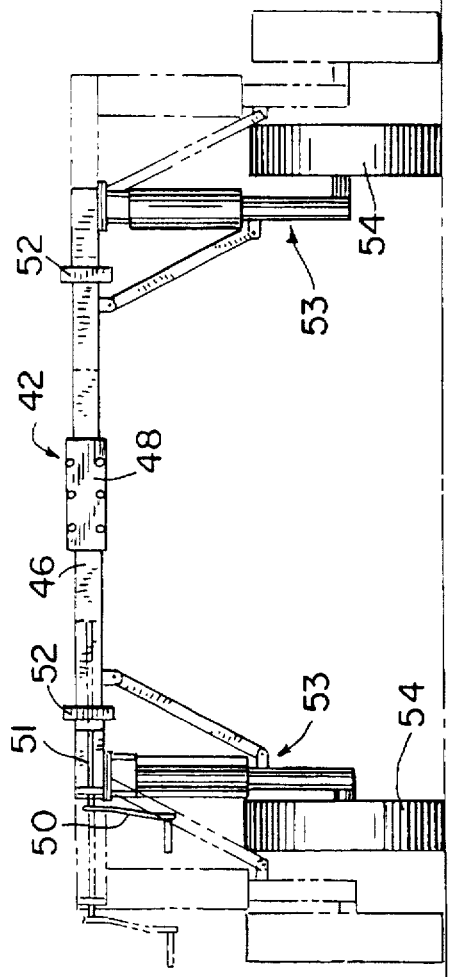
FIG. 15 is a rear view of the rake shown in FIG. 3 and illustrating an adjustment arrangement for the cross-member assembly.

As shown in FIGS. 2 and 15, each of the spaced ends of cross-member assembly 42 is provided with a downwardly depending, ground engaging wheel assembly 53 having a rubber-tired wheel 54 arranged to rotate in a fixed forwardly and rearwardly direction only. In contrast, a single ground engaging wheel assembly 55 (FIGS. 2, 4, 5) having a mounting arm 56 depending downwardly at an acute angle with respect to the longitudinal axis of central arm 40 and a self-directing, rubber-tired wheel 57 is swivably mounted about a vertical axis on the forward end of central arm 40.

As seen in FIGS. 4 and 5, wheel 57 is mounted to a bracket 58 which in turn is mounted to a shaft 59 received within a sleeve 60. Wheel assembly 55 is provided with a bracket assembly 61 which is screwthreaded to receive a screw 62 surrounded by a spring 63 such that rotation of the biased screw 62 will enable an adjustment of pressure of the wheel assembly 55 relative to the ground.

Figure 16:
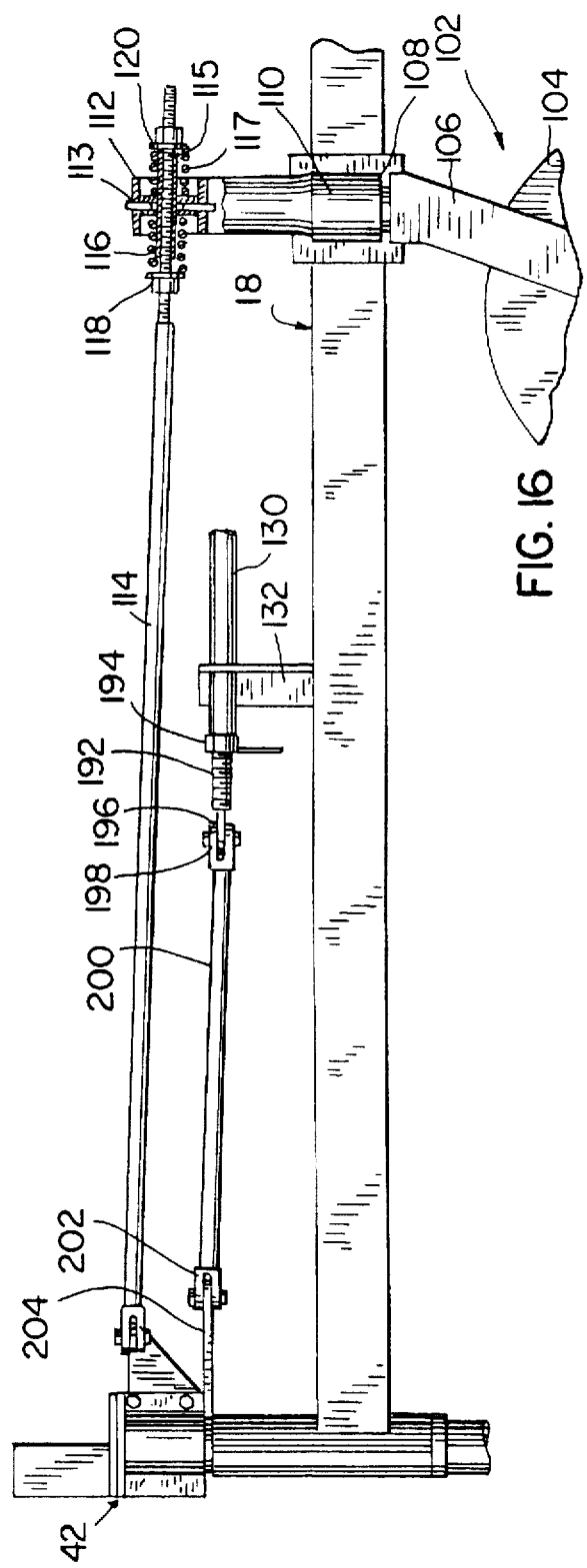
FIG. 16 is a side view of part of the raising and lowering mechanism for the rake wheels and part of the mechanism for biasing the forwardmost ground wheel of trolley assembly.

As a salient feature of the invention, a pair of articulated rake arm assemblies 18 are pivotably mounted, one to each end of the spaced ends of cross-member assembly 42. Referring to FIGS. 1–3, 6 and 7, each rake arm assembly 18 has a rearward end of a first side frame 64 connected to a bracket 66 having a collar 68 which is rotatable about the vertical axis of a post 70 projecting downwardly from each outboard end of cross-member assembly 42. Each side frame 64 is comprised of a first portion 72 and a second portion 74 bolted together by means of mating flanges 76. The rearward end of first side frame 64 is also pivotably connected to bracket 66 by a bolt and nut arrangement 78 about the longitudinal, horizontal axis of the bolt in arrangement 78. The forward end of first side frame 64 and the rearward end of a second side frame 80 are received in a sleeve 82, and are pivotably joined together by a bolt and nut arrangement 84 about the longitudinal, horizontal axis of the bolt in arrangement 84. As seen in FIG. 3, second side frame 80 is comprised of a first portion 86 having a flange 88 on its forward end connected to a mating flange 90 on the rearward end of a side frame extension 92. The forward end of side frame extension 92 has a flange connection 94 to a wheel bracket 96 for supporting a ground engaging wheel assembly 98 having a self-directing, rubber-tired wheel 100 on the inboard side of each rake arm assembly 18. A wheel assembly 102 having a self-directing, rubber-tired wheel 104 is attached to the forward end of the first side frame 64 on the outboard side of rake arm assembly 18. As seen in FIG. 16, wheel 104 is mounted to bracket 106 which in turn is mounted to a shaft 108 received within a sleeve 110. Each sleeve 110 is secured to one of the rake arm assemblies 18. A bracket assembly 112 is mounted to the upper end of each shaft 108. A receiver 113 is pivotably mounted between the upper and lower horizontal plates of bracket assembly 112 via a pair of vertical pins. A rod such as 114 is pivotably mounted at its rearward end to cross-member assembly 42. A threaded forward portion of rod 114 extends through a sleeve 115, which in turn extends through a passage defined by receiver 113. A pair of springs 116, 117 are engaged between receiver 113 and a pair of stops 118, 120, respectively, secured to rod 114 for biasing each tire 104 to an orientation in which it is substantially parallel to the longitudinal axis of draw bar assembly 12. The nuts which secure stops 118, 120 to the threaded portion of rod 114 can be adjusted to vary the biasing force exerted by springs 116, 117.

It should be understood that wheel assemblies 102 operate to assist in directing or steering the wheels 104 as the hay rake is turned by the tractor to which it is attached. Lateral movement of the draw bar assembly 12 as the tractor is turned results in a slight pivotal movement of each rake arm assembly 18 about its respective pivotal connection to cross-member assembly 42. This pivotal movement results in slight shortening or lengthening respectively, of the spring-biased connection of each connecting rod 114 to its respective bracket assembly 112 of the wheel. As a result, both wheels 104 are biased to turn in the same direction as the draw bar assembly 12 is being turned by the tractor. Self-directing wheel 57 of wheel assembly 55 on the trolley assembly 16 and self-directing wheels 100 of wheel assemblies 98 on the side frame extensions 92 also turn in response to the path of the tractor.

Figure 17:
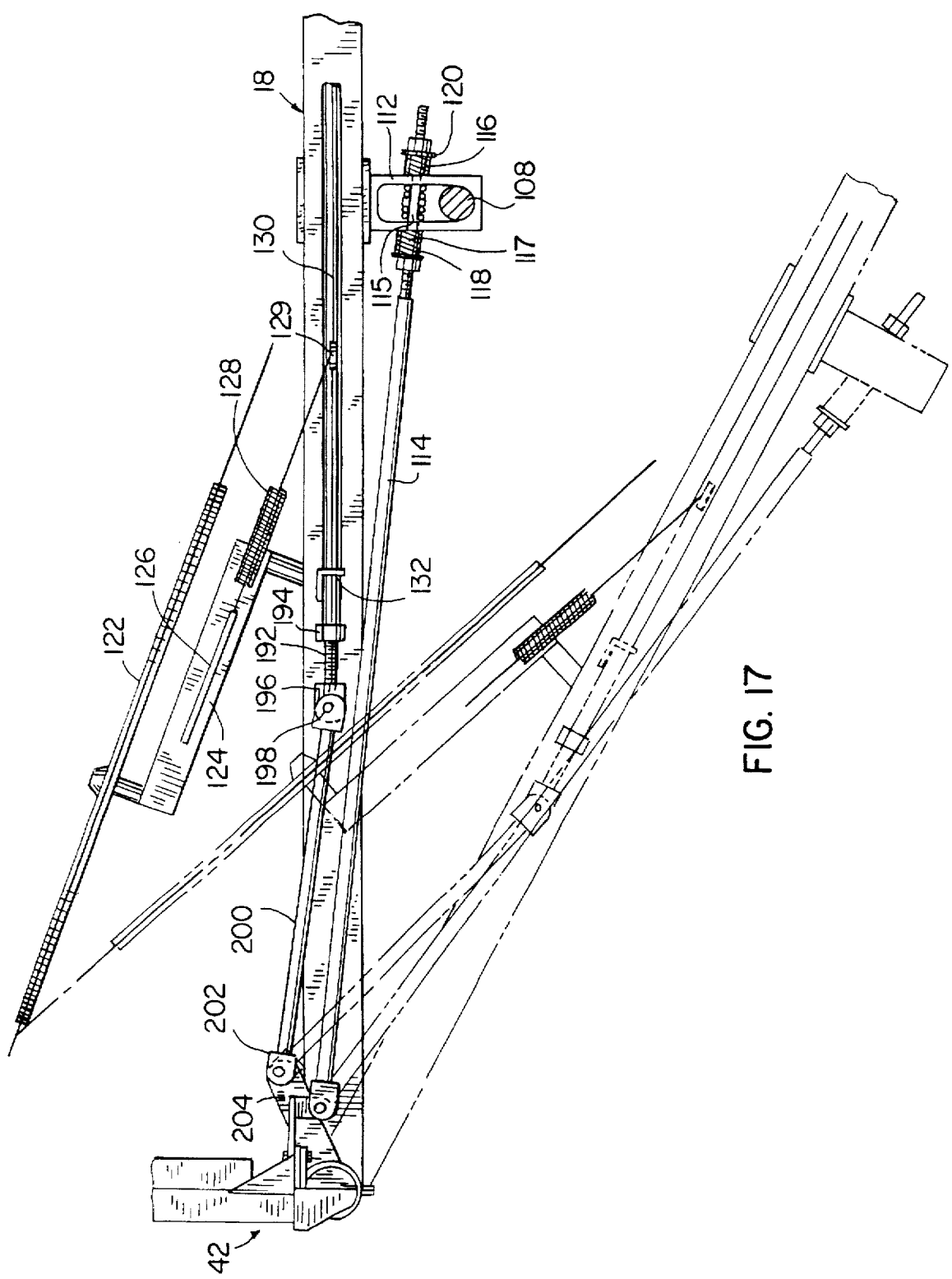
FIG. 17 is a top view of the mechanism shown in FIG. 16

A series of rake wheels 122 are mounted to each rake arm assembly 18. Rakes 122 are conventional in construction and each is mounted to rake arm assemblies 18 by a mounting assembly providing movement between an inoperative, raised position as shown in FIGS. 2 and 3, and an operative, lowered position as seen in FIG. 1. As shown in FIG. 17, each rake mounting assembly includes a bar 124 pivotably mounted at one end to one of the rake arm assemblies 18. A rake 122 is rotatably mounted to the opposite end of each bar 124. A second bar 126 is rigidly mounted to each bar 124 extending upwardly and perpendicularly therefrom. A spring 128 is connected between the end of bar 126 opposite bar 124 and a tab 129 mounted to a control rod 130. Each control rod 130 extends parallel to the rake arm assembly 18 to which it is mounted. Control rods 130 are interconnected with each other via a knuckle assembly 131 adjacent the connection of first side frame 64 to second side frame 80. A series of vertical angle members 132 are mounted to the upper surfaces of each rake arm assembly 18 and each control rod 130 extends through aligned openings formed in vertical members 132 for providing longitudinal movement of control rods 130 relative to rake arm assemblies 18. Rearward movement of control rod 130 results in lowering each rake 122 to its lower, operative position by providing rearward pivoting movement of each bar 124 about its connection to rake arm assemblies 18 while forward movement of control rods 130 results in raising of rakes 122 to the inoperative, raised position by providing upwardly pivoting movement of each bar 124. In the preferred embodiment, a hydraulic cylinder 134 (FIG. 3) mounted on each second side frame 80 of rake arm assembly 18 is connected to a respective control rod and used to extend and retract rods 130 to lower and raise rake wheels 122 on the rake arm assemblies 18.

Referring now to FIGS. 1 and 8–13, trolley assembly 16 provides a mounting structure for an opening and closing mechanism for rake arm assemblies 18 and for a central rake arm arrangement. A bracket 136 having a downwardly depending portion 138 (FIGS. 10–11) is slidably mounted to central arm 40. A pair of articulated support arm assemblies 140 are pivotably mounted at their rearward ends to mounting bracket 136 and pivotably connected at their forward ends to rake arm assemblies 18. Each support arm assembly 140 includes a series of three support members 142, 144, 146 interconnected together by fasteners 148, 150, 152, respectively, such that support member 142 is pivotably mounted about a vertical axis on bracket 136 and support member 142 is pivotably connected about a horizontal axis on parallelogram support member 144. Support member 144 is pivotably mounted about a horizontal axis and a vertical axis on support member 146, and support member 146 is pivotably connected about a vertical axis on rake arm assembly 18. A hydraulic cylinder 154 used for opening and closing the rake arm assemblies has a cylinder end mounted to bracket 138 and includes an extendable and retractable rod 156 pivotably mounted to the forward ends of a pair of support struts 158, 160. The rearward end of each strut 158, 160 is provided with a roller 162 which rides against the rearward surface of support member 142.

As illustrated in FIG. 1, operation of the hydraulic cylinder 154 to retract its rod 156 results in movement of support linkage 14 and support arm assemblies 140 to their first position to open rake arm assemblies 18 during forward movement of tractor 26. As shown in FIG. 2, operation of hydraulic cylinder 154 to extend its rod 156 results in movement of support linkage 14 and support arm assemblies 140 to their second position to close the rake arm assemblies 18. Hydraulic cylinder 154 is interconnected with a conventional operator controlled actuator mechanism for moving rake arm assemblies 18 between their open and closed positions. Ideally, hydraulic cylinder 154 is interconnected with the actuating system for hydraulic cylinders 134 in order to provide for simultaneous raising and lowering of rake wheels 122 during extension and retraction of hydraulic cylinder 154 to open and close rake arm assemblies 18.

Referring to FIGS. 1, 8, 10, 13 and 14, trolley assembly 16 also serves as a mounting structure for an additional rake or splitter wheel assemblies 164, 166 used for moving the central windrow in a balanced manner. Each splitter wheel mounting assembly includes an elongated arm 168 at the center of which a splitter wheel 170 is mounted for rotation. The rearward end of each arm 168 is pivotably mounted about a horizontal axis to the forward end of a downwardly angled coupling member 172 which in turn is pivotably joined about a vertical axis to support member 144. The forward ends of arms 168 are pivotably connected together about a vertical axis at a junction having a hook 174 for retaining the forward end of a cable 176 having a spring 178. Cable 176 extends under a pulley 180 and is anchored at its rearward end to a second hook 182 disposed on a clamp 184 slidably mounted on central arm 40. A slotted fork 186 extends rearwardly from second hook 182 to a retainer 188 provided on the forward end of bracket 136. The slotted connection between bracket 136 and clamp 184 allows these components to slide back and forth relative to each other on central arm 40 in response to actuation of hydraulic cylinder 154. With this arrangement, extending hydraulic cylinder 154 to close rake arm assemblies results in pulling cable 176 rearwardly to raise splitter wheels 170 to their inoperative, raised position (FIG. 14). Retracting hydraulic cylinder 154 to open rake assembly 18 results in slackening cable 176 so that under the weight of splitter assemblies 164, 166, splitter wheels 170 will be lowered to their operative position as shown in FIG. 14.

Upon retraction of hydraulic cylinder 154, clamp 184 slides forwardly on central arm 40 as rake assembly 18 is being opened, to lower splitter wheels 170 toward the ground. An adjustment crank 189 (FIGS. 8, 13) is mounted to central arm 40, and is positioned such that its rearward end engages clamp 184 to control the forward position of clamp 184. Adjustment of crank 189 enables an operator to regulate the pressure exerted by splitter wheels 170 on the ground, by adjusting the forwardmost position of clamp 184, and thereby hook 182 with which cable 176 is engaged.

Referring to FIG. 2, a locking bar 190 is interposed between wheel assemblies 98 for retaining the support linkage 14 and support arm assemblies 140 in their second position when rake arm assemblies are closed to prevent opening of rake arm assemblies 18 such as during transport or storage of the rake 10. Both ends of the locking bar 190 and the wheel assemblies 98 are provided with conventional removable fastening arrangements which enable an operator, for example, to simply pull a pair of bolts from aligned and apertured ears on the ends of the locking bar and wheel assemblies. Locking bar 190 can then be stored elsewhere on the rake such as along side one of the rake arm assemblies 18.

In the drawings and the above description, moving of rake arm assemblies 18 between the open and closed positions has been shown and described by operation of hydraulic cylinder 154 acting on support linkage 14 and support arm assemblies 140. Operation of hydraulic cylinder 154 will also lower and raise each splitter wheel 170 in synchronism with the opening and closing of rake arm assemblies 18.

Hydraulic cylinders 134 are inter-engaged with the system of hydraulic cylinder 154 so that each of the rake wheels will also be lowered and raised simultaneously with the raising and lowering of splitter wheels 170. It is also within the scope of the invention to eliminate hydraulic cylinder 154 so that rake arm assemblies can be moved between their open and closed position in response to backward or forward movement of rake 10 by operation of the tractor 26. For example, after locking bar 190 is removed, when support linkage 14 and support arm assemblies 140 are in their second position and rake arm assemblies 18 are in their closed position, the operator can draw rake 10 forwardly to move rake arm assemblies 18 to their open position. To close rake arm assemblies 18, the operator moves rake 10 in a rearward direction which causes rake arm assemblies 18 to move together in their closed position. With this arrangement, hydraulic cylinders 134 continue to move control rods 130 and thereby control raising and lowering of rake wheels 122.

An alternative mechanical construction to the hydraulic cylinders 134 for raising and lowering rake wheels 122 is illustrated in FIGS. 16 and 17. The rearward end of each control rod 130 has a regulating screwthreaded portion 192 carrying an adjustable nut 194 and terminating in a link 196 pivotally attached to the forward end 198 of a rigid tie rod 200. The rearward end 202 of the tie rod 200 is pivotally secured to a bracket 204 on the cross-member assembly 42 below rod 114. With this arrangement, as the operator draws rake 10 forwardly to move rake arm assemblies 18 to their open position (as shown in phantom in FIG. 17), each tie rod 200 and control rod 130 is swung and extended appropriately to lower rake wheels 122 into position on the rake arm assemblies 18. Closing the rake arm assemblies 18 will shorten each tie rod 200 and control rod 130 and cause the rake wheels 122 to be raised. To accommodate for various working widths of the rate 10, adjustable nut 194 is screwthreaded along the portion 192 so as to anticipate the corrected lengthening or foreshortening of the tie rod 202 and control rod 130.

The bifold hay rake 10 described above is particularly noteworthy in that the provision of articulated rake arm assemblies 18 and the articulated support arm assemblies 140 enable the rake wheels 122 to maintain a constant distance from the ground regardless of terrain, as depicted in FIG. 3. In addition, the provision of twin splitter wheels 170 mounted on the trolley assembly 16 will evenly divide the forage to form a twin rear windrow of equal quantity in order to produce a bale of hay with the same density on each side. It should also be appreciated that additional side frame extensions carrying additional rake wheels may be easily attached due to the flange connections on the end of the forwardmost side frame by removing the wheel extensions 92.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with following claims.

I claim:

1. A pull-type bifold hay rake comprising:

a draw bar assembly connected to a tow vehicle;

a support linkage connected to said draw bar assembly;

a trolley assembly spaced from and independent of said support linkage, said trolley assembly including a central arm having a forward end and a rearward end, and a cross-member assembly having a pair of spaced ends, said rearward end of said central arm being mounted substantially perpendicularly to said cross-member assembly, said forward end of said central arm being provided with a first ground engaging wheel and each of said ends of said cross-member assembly being provided with second and third ground engaging wheels, respectively;

a pair of rake arm assemblies pivotably mounted one to each of said ends of said cross-member assembly, each of said rake arm assemblies having a plurality of rotatable rake wheels mounted thereto for movement between an inoperative, raised position and an operative, lowered position, each of said rake arm assemblies being pivotable between an operative, open position in which said rake arm assemblies are moved away from each other and an inoperative, closed position in which said rake arm assemblies are moved towards each other, each of said rake arm assemblies also being connected to said support linkage at a point spaced from said pivotable mounting of each said rake arm assembly to said cross-member assembly; and means interconnected with said trolley assembly and each said rake arm assembly for moving said rake arm assemblies between said open position and said closed position.

2. The rake of claim 1, wherein said means for moving said rake arm assemblies between said open position and said closed position is located on said central arm.

3. The rake of claim 1, including a bracket slidably mounted along said central arm and a pair of support arm assemblies, each having an inner end pivotably attached to said bracket and an outer end pivotably attached to one of said rake arm assemblies.

4. The rake of claim 3, including a pair of coupling members for supporting a pair of splitter wheel assemblies one on each side of said central arm, each of said coupling members having a rearward end pivotably mounted to one of said support arm assemblies and a forward end pivotably mounted to one of said splitter wheel assemblies, each of said splitter wheel assemblies being mounted for movement between an inoperative raised position and an operative lowered position.

5. The rake of claim 1, wherein said cross-member assembly is constructed and arranged to be lengthened and shortened by an operator.

6. The rake of claim 1, including fourth and fifth ground engaging wheels, each being mounted generally midway along and outboard of one of said rake arm assemblies.

7. The rake of claim 6, including sixth and seventh ground engaging wheels, each being mounted inboard of one of said rake arm assemblies at a point opposite the pivotal mounting of one of rake arm assemblies to one of said ends of said cross-member assembly.

8. The rake of claim 1, wherein said support linkage comprises a series of link members pivotably interconnected with each other and with said draw bar assembly and wherein a pair of said link members are pivotably connected with each other between said draw bar and one of said rake arm assemblies.

9. The rake of claim 1, including means for raising and lowering said rake wheels.

10. The rake of claim 4, including means located on said trolley assembly for raising and lowering said splitter wheel assemblies.

11. The rake of claim 1, including means mounted on said central arm for regulating the pressure applied to said first ground engaging wheel on said trolley assembly.

12. The rake of claim 1, wherein said first ground engaging wheel is constructed and arranged on said central arm to follow the path of said tow vehicle.

13. A pull-type bifold hay rake suitable for use on even and uneven terrains comprising:

a draw bar assembly connected to a tow vehicle;

a cross-member assembly spaced from and independent of said draw bar assembly and terminating in a pair of spaced ends, one disposed on either side of said draw bar assembly;

a pair of rake arm assemblies pivotably mounted one to each end of said cross-member assembly, each rake arm assembly having a plurality of rotatable rake wheels mounted thereto, each of said rake arm assemblies being pivotable between an operative, open position in which said rake arm assemblies are moved away from each other and an inoperative, closed position in which said rake arm assemblies are moved toward each other;

wherein said rake wheels are movably mounted to said rake arm assemblies for movement between an inoperative, raised position and an operative, lowered position;

a series of ground engaging wheels mounted to said rake arm assemblies on either side of said draw bar assembly;

a support linkage interconnecting said draw bar assembly and said rake arm assemblies;

a rake arm assembly actuator mechanism for selectively moving said rake arm assemblies between said open and closed positions; and a rake wheel actuator mechanism for selectively moving said rake wheels between said raised and lowered positions;

wherein each of said rake arm assemblies include a first side frame and a second side frame pivotably mounted to said first side frame, said first and second side frames constructed and arranged to provide an articulated movement such that said rake wheels maintain a constant distance from the ground regardless of uneven terrain.

14. The rake of claim 13, wherein said first side frame has a rearward end and a forward end, and said second side frame has a rearward end and a forward end, said rearward end of said first side frame being pivotably mounted about a vertical axis and pivotably mounted about a first horizontal axis to one of said ends of said cross-member assembly, said forward end of said first side frame being pivotably mounted about a second horizontal axis to said rearward end of said second side frame.

15. The rake of claim 14, wherein each of said rake arm assemblies include an extension mounted to each of said forward ends of said second side frames.

16. The rake of claim 13, wherein certain of said ground engaging wheels are positioned outboard of each of said rake arm assemblies preventing outward movement of each of said rake arm assemblies beyond said open position.

17. The rake of claim 16, including means for removably connecting said other of said ground engaging wheels to each other when said rake arm assemblies are in said closed position.

18. A pull-type bifold hay rake comprising:

a draw bar assembly connectable to a tow vehicle;

a support linkage connected to said draw bar assembly;

a cross-member assembly spaced from and independent of said draw bar assembly and terminating in a pair of spaced ends, one disposed on either side of said draw bar assembly;

a pair of rake arm assemblies pivotably mounted to one of each of said ends of said cross-member assemblies for movement between an operative open position in which said rake arm assemblies are moved away from each other and an inoperative, closed position in which said rake arm assemblies are moved towards each other, each of said rake arm assemblies having a plurality of rake arm wheels mounted thereto for movement between an inoperative raised position and an operative lowered position, each of said rake arm assemblies also being connected to support linkage;

a central arm mounted substantially perpendicularly to said cross-member assembly;

a pair of splitter wheel assemblies, one being mounted on each side of said central arm for movement between an inoperative, raised position and an operative lowered position; and a pair of support arm assemblies, each having an inner end attached to said central arm and an outer end attached to one of said rake arm assemblies.

19. The rake of claim 18, including a pair of coupling members for supporting said splitter wheel assemblies, each of said coupling members having a rearward end pivotably mounted to one of said support arm assemblies and a forward end pivotably mounted to one of said splitter wheel assemblies.

20. The rake of claim 18, including means for raising and lowering said splitter wheel assemblies.

21. The rake of claim 18, including means for regulating the pressure of said splitter wheel assemblies when said splitter wheel assemblies are in their lowered operative position.

22. The rake of claim 18, said splitter wheel assemblies being lowerable in response to said movement to said operative open position of said rake arm assemblies.

23. A pull-type bifold hay rake comprising:

a draw bar assembly connectable to a tow vehicle;

a support linkage connected to said draw bar assembly;

a cross-member assembly spaced from and independent of said draw bar assembly and terminating in a pair of spaced ends, one disposed on either side of said draw bar assembly;

a pair of rake arm assemblies pivotably mounted one to each of said ends of said cross-member assembly for movement between an operative open position in which said rake arm assemblies are moved away from each other and an inoperative, closed position in which said rake arm assemblies are moved towards each other, each of said rake arm assemblies having a plurality of rake arm wheels mounted thereto for movement between an inoperative raised position and an operative lowered position, each of said rake arm assemblies also being connected to said support linkage;

a central arm mounted substantially perpendicularly to said cross-member assembly;

a hydraulic opening and closing arrangement mounted on said central arm for selectively moving said rake arm assemblies between said open position and said closed position; and a bracket slidably mounted on said central arm and a pair of support arm assemblies, each having an inner end pivotably attached to said bracket and an outer end pivotably attached to one of said rake arm assemblies.

24. The rake of claim 23, wherein said hydraulic opening and closing arrangement comprises a hydraulic cylinder having a cylinder end and an extendable and retractable rod, said cylinder end being mounted to said bracket and said rod being operably connected to said support arm assemblies.

25. A pull-type bifold hay rake for forming a windrow of crop material, said rake comprising:

a draw bar assembly connectable to a tow vehicle;

a support linkage connected to said draw bar assembly;

a cross-member assembly spaced from and independent of said draw bar assembly and terminating in a pair of spaced ends, one disposed on either side of said draw bar assembly;

a pair of rake arm assemblies pivotably mounted one to each of said ends of said cross-member assembly for movement between an operative open position in which said rake arm assemblies are moved away from each other and an inoperative, closed position in which said rake arm assemblies are moved towards each other, each of said rake arm assemblies having a plurality of rake arm wheels mounted thereto for movement between an inoperative raised position and an operative lowered position, each of said rake arm assemblies also being connected to said support linkage;

said cross-member assembly further comprising a bracket and a pair of beams, each of said beams being slidably mounted with respect to each other within said bracket to vary the width of said cross-member assembly so as to increase or decrease the width of the windrow of crop material formed upon operation of said rake, said beams lockable with respect to each other.

26. The rake of claim 25, including actuating means mounted on said cross-member assembly for sliding said beams back and forth with respect to each other.

27. A pull-type bifold hay rake comprising:

a draw bar assembly connectable to a tow vehicle;

a support linkage connected to said draw bar assembly;

a cross-member assembly spaced from and independent of said draw bar assembly and terminating in a pair of spaced ends, one disposed on either side of said draw bar assembly;

a pair of rake arm assemblies pivotably mounted one to each of said ends of said cross-member assembly for movement between an operative open position in which said rake arm assemblies are moved away from each other and an inoperative, closed position in which said rake arm assemblies are moved towards each other, each of said rake arm assemblies having a plurality of rake arm wheels mounted thereto for movement between an inoperative raised position and an operative lowered position, each of said rake arm assemblies also being connected to said support linkage;

at least one extendable and retractable control rod slidably mounted on each of said rake arm assemblies, one portion of said control rod being operably connected to each of said rake arm wheels, said control rod being slidably constructed and arranged to move each of said rake arm wheels between said inoperative raised position and said operative lowered position; and a tie rod pivotably connected between said cross-member assembly and a threaded portion of said control rod, said movement of said rake arm assemblies to said open position causing said tie rod to pivot and said control rod to extend to move each of said rake arm wheels to said lowered position and to retract to move each of said rake arm wheels to said raised position.

28. The rake of claim 27, including a hydraulic cylinder mounted on one of said rake arm assemblies, said hydraulic cylinder having an extendable and retractable rod connected to said control rod for moving each of said rake arm wheels between said raised position and said lowered position.

29. A pull-type bifold hay rake comprising:

a draw bar assembly connectable to a tow vehicle;

a support linkage connected to said draw bar assembly;

a cross-member assembly spaced from and independent of said draw bar assembly and terminating in a pair of spaced ends, one disposed on either side of said draw bar assembly;

a pair of rake arm assemblies pivotably mounted one to each of said ends of said cross-member assembly for movement between an operative open position in which said rake arm assemblies are moved away from each other and an inoperative, closed position in which said rake arm assemblies are moved towards each other, each of said rake arm assemblies having a plurality of rake arm wheels mounted thereto for movement between an inoperative raised position and an operative lowered position, each of said rake arm assemblies also being connected to said support linkage;

wherein each of said rake arm assemblies include a first side frame and a second side frame pivotably mounted to said first side frame, and wherein said first side frame has a rearward end and a forward end, said second side frame has a rearward end and a forward end, said rearward end of said first side frame being pivotably mounted about a vertical axis and pivotably mounted about a first horizontal axis to one of said ends of said cross-member assembly, said forward end of said first side frame being pivotably mounted about a second horizontal axis to said rearward end of said second side frame.

* * * * *

UNITED STATES PATENT AND TRADEMARK OFFICE
CERTIFICATE OF CORRECTION

PATENT NO. : 5,752,375
DATED : May 19, 1998
INVENTOR(S) : CARLETTO TONUTTI

It is certified that error appears in the above-indentified patent and that said Letters Patent is hereby corrected as shown below:

In The Claims

Claim 18, column 11, line 6, delete "to one of" and substitute therefor -- one to --; Claim 18, column 11, line 13, after "rake" delete "arm"; Claim 23, column 11, line 56, after "rake" delete "arm"; Claim 25, column 12, line 23, after "rake" delete "arm"; Claim 27, column 12, line 53, after "rake" delete "arm"; Claim 28, column 13, line 7, after "rake" delete "arm"; Claim 29, column 14, line 3, after "rake" delete "arm".

Signed and Sealed this

Seventeenth Day of August, 1999

Attest:

Q. TODD DICKINSON

*Attesting Officer*   *Acting Commissioner of Patents and Trademarks*